Figure 7:
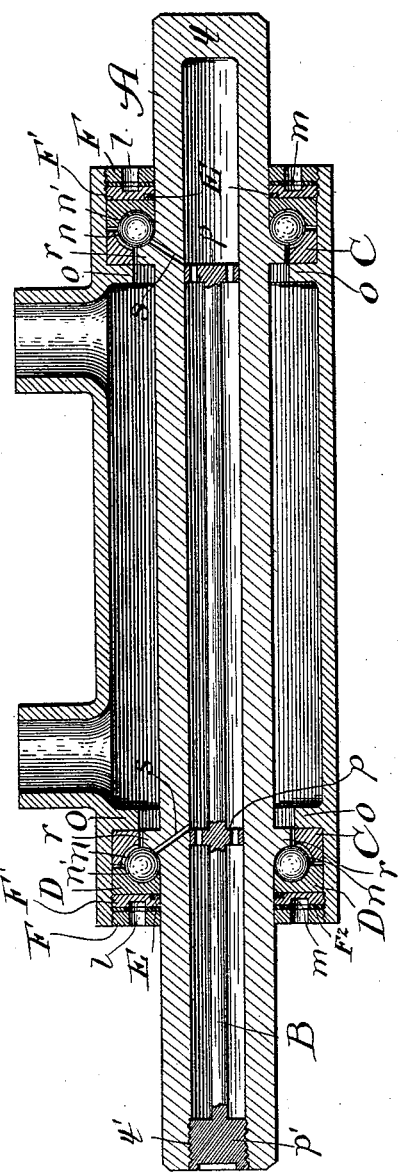

(No Model.)  2 Sheets—Sheet 1.
M. J. O'DONNELL.
VELOCIPEDE.
No. 481,118.  Patented Aug. 16, 1892.
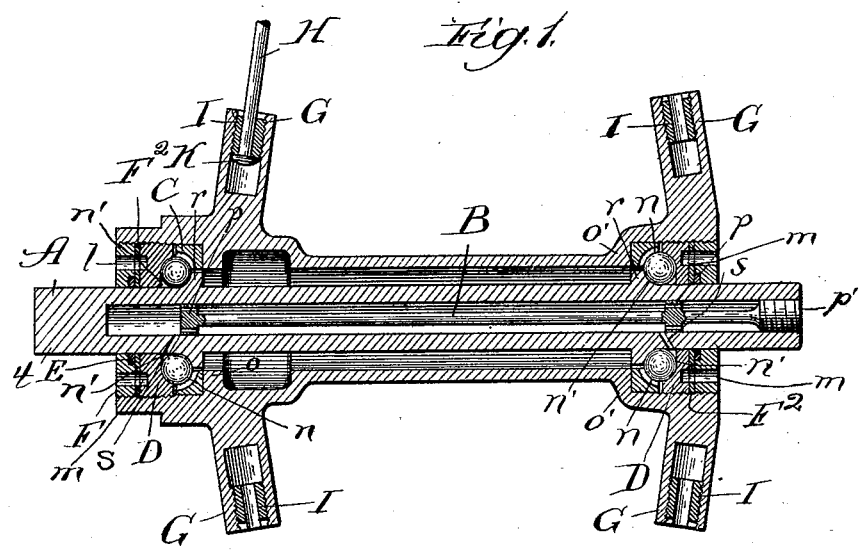
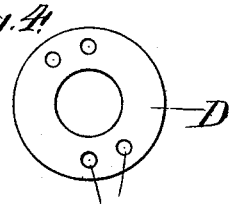
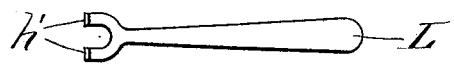
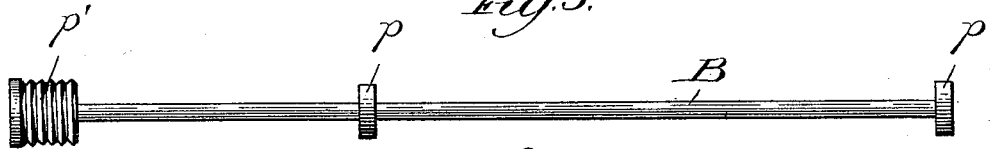
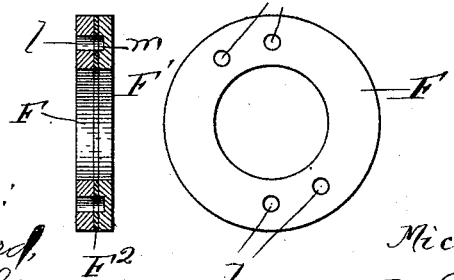
Witnesses:
Inventor:
Michael J. O'Donnell,
By Dyrenforth & Dyrenforth
Attys.

(No Model.) 2 Sheets—Sheet 2.

M. J. O'DONNELL.
VELOCIPEDE.

No. 481,118. Patented Aug. 16, 1892.

Witnesses:
Inventor.
Michael J. O'Donnell,
By Dyrenforth & Dyrenforth
Attys

UNITED STATES PATENT OFFICE.

MICHAEL J. O'DONNELL, OF CHICAGO, ILLINOIS, ASSIGNOR OF THREE-FOURTHS TO GEORGE G. BRANDENBURG AND GEORGE R. WALKER, OF SAME PLACE.

VELOCIPEDE.

SPECIFICATION forming part of Letters Patent No. 481,118, dated August 16, 1892.

Application filed December 1, 1891. Serial No. 413,693. (No model.)

*To all whom it may concern:*

Be it known that I, MICHAEL J. O'DONNELL, a citizen of the United States, residing at Chicago, in the county of Cook and State of Illinois, have invented a new and useful Improvement in Velocipedes, of which the following is a specification.

My invention relates to an improvement in velocipedes, applicable, also, to all kinds of vehicles and other devices, especially such as employ a ball or similar bearing between the shaft and a revolving hub or cylinder, and has for its object, primarily, to render the matter of introducing and distributing lubricant into the bearing more effective and uniform and capable of being regulated so that the supply shall substantially compensate for the expenditure of lubricating material.

My invention has for its further object an improved method of attaching the spokes of a velocipede—such as a bicycle—to the hub.

My invention consists in a lubricant receiving and distributing device for the bearing between the shaft and journal or hub of a velocipede or similar device, comprising a hollow shaft containing a piston adjustable in a desirable manner, said piston operating as a valve and the hollow shaft to contain oil or similar lubricant, said shaft being provided with narrow passages leading from the interior thereof to the balls or other points at which the lubricant is to be distributed and the valves afforded by the piston-heads operating to open and close said passages when properly adjusted.

I do not limit my invention to any specific mode of sustaining the ball-bearings or similar mechanism in place; but as applied to a bicycle I prefer to confine them in the usual manner through the medium of a sleeve constituting the hub and provided at its opposite ends with means for confining the balls in place, as to which, also, I prefer to use a special construction hereinafter more fully described. When this hub constitutes the hub of a wheel, it is made revoluble on a stationary shaft containing the lubricating material, and I prefer in such case, also, to provide the hub with the preferred construction of thimble to receive the spokes, employing, also, an improved mechanism for tightening the spokes in place. When the hub is that termed the "pedal-hub," from which lead the arms for supporting it upon a seat and other stationary parts of the machine, the interior hollow shaft carrying, as usual, the driving-gear and pedals, is made revoluble within the hub instead of stationary, as is the case of the wheel-shaft.

My invention consists, further, in the preferred construction and combinations of parts, all as hereinafter more fully set forth.

Figure 9:
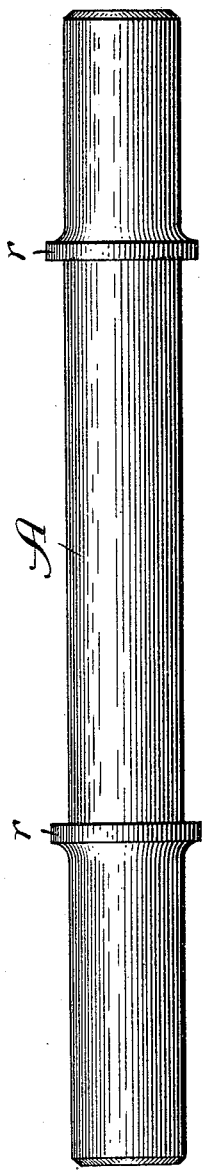
Figure 8:
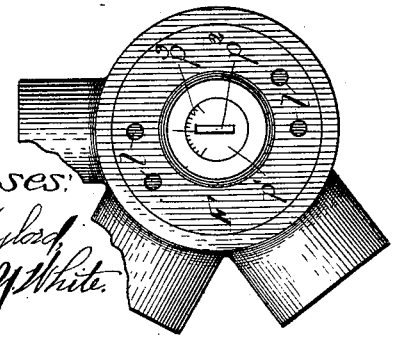
Figure 10:
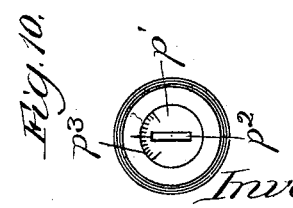

In the drawings, which are made to represent the application of my improvement to a bicycle, Figure 1 is a vertical longitudinal section taken through the wheel-hub and axle and showing the preferred mode of employing the lubricating device and of connecting and tightening the spokes. Fig. 2 is a representation of the bushing employed for retaining and tightening the spokes; Fig. 3, a plan view of the wrench employed to engage and turn the bushing shown at Fig. 2. Fig. 4 is an end elevation of the outer ring, affording a lateral bearing for the balls; Fig. 5, a side elevation of the valve-rod for the lubricating device, enlarged; Fig. 6, a view representing a modified construction of the nuts for holding the balls against outward displacement. Fig. 7 is a longitudinal central section taken through the pedal-bearing and showing the application of my invention thereto; Fig. 8, an end elevation of the pedal-bearing; Fig. 9, a view in side elevation of the pedal-bearing shaft, and Fig. 10 an end view of said shaft.

A represents a hollow shaft closed at one end, as indicated at $t$, and provided at the opposite end with internal screw-threads $t'$. Passages, preferably diagonal, as indicated at $s$, extend through the wall of the shaft A and lead to the annular space produced in the manner hereinafter described, in which the balls are located. At points on the shaft A where the ball-bearings will engage the same are provided shoulders $r$ $r$, each of which on its inner face is square and each of which on its outer face is rounded to produce a concave annular bearing for the balls. Whether the shaft A is a stationary shaft, as in Fig. 1, or a revoluble shaft, as in Fig. 7, its construction in all particulars is substantially the same, except that in the construction shown in Fig. 1 it is provided, as usual, with means for connecting the front or rear fork, and in the form shown in Fig. 7 it is provided with suitable means for bringing about its revolution under the action of the pedal and distributing its revolution through proper gear mechanism to the drive-wheel. These adjuncts are not illustrated, as they may be of any usual construction.

Within the shaft, the interior of which, it will be understood, affords an oil-receptacle, is introduced a rod B, carrying at its extremity and at a point intermediate between the extremities a perforated piston-head $p$, and carrying at its inner end an externally-screw-threaded enlargement or head $p'$, recessed in its face, as shown at $p^2$, and provided, also, if desired, with a scale $p^3$. The piston-heads $p$ are arranged upon the rod B at points to cause them, when the heads $p'$ are screwed as far as possible into the shaft, to close the apertures $s$, leading from the interior of the shaft to the bearings. The revolution of the rods to cause this movement may be effected by any suitable tool—such as a screw-driver—introduced into the recess $p^2$ in the head $p'$. The scale, if employed, may be used to indicate the point at which the head $p'$ has been revolved sufficiently entirely to open the passages $s$ to permit oil to pass from the cylinder to the bearings. If desired and found necessary, means for admitting air to the interior of the shaft to cause the feed of oil to be more perfect may be provided in a convenient manner and the same be opened and closed by the turning of the head $p'$.

The hub, whether the same be revoluble or stationary, is provided with the inward projecting annular shoulders $o$, square at their outer face. It is usually deemed preferable to produce one of said shoulders in the case of the wheel-hub (illustrated in Fig. 1) by enlarging and squaring the body of the cylinder, as indicated at $o'$ in that figure. Either method may be employed at both sides without departing from my invention. It is important, however, that the internal diameter of the cylinder within the shoulder shall be slightly in excess of the external diameter of the shaft A, including the shoulder $r$, so that the shaft may be readily introduced into the hub and withdrawn therefrom when the devices otherwise tending to secure it in position shall be removed. The purpose of the annular shoulder $o$ $o'$ is to prevent the balls when introduced into the hub from passing beyond the bearing therefor provided on the shaft, as presently described. A ring C, having an internal diameter slightly in excess of the diameter of the shaft at the shoulder $r$ and an external diameter to cause it to fit closely within the hub beyond the shoulders $o$ $o'$, is introduced into the hub, as indicated in the drawings. The ring C should fit so closely as practically to be prevented from revolution, thus to save any frictional resistance at this point. The ring is provided at the lower outer side in an annular line with an annular concavity, as indicated at $n$ in the figures. The ring C thus serves the function of lengthening the shoulder $o$ to bring the same nearer the extremity of the hub. It will be quite apparent that this function may be obtained by making the inward projecting annular shoulder $o$ longer longitudinally of the hub or by causing it to be located nearer the extremity of the hub. When the shoulder and ring C are made in a single piece in the obvious manner here suggested, it is grooved to provide an annular concavity to correspond with the concavity $n$. The curvature afforded by this groove to the base of the rest for the balls before they are secured in place enables the balls to be more readily directed between the opposite bearing-surfaces afforded between the shoulder $r$ and the ring D, hereinafter described, when the parts are secured together. The outer bearing for the balls is in the form of a ring D, somewhat similar to the ring C, but having an internal diameter slightly in excess of the external diameter of the shaft A. This ring may be provided on its inner face with an annular concavity, as indicated at $n'$, to afford a way for the balls in the bearing, this construction being thus illustrated in Fig. 7, or it may be provided with a concavity not semicircular while still serving to confine the balls against lateral displacement, as indicated in Fig. 1. Of these constructions that shown in Fig. 7 is preferable, although the matter of advantage is slight. The periphery of the ring D may be screw-threaded, or it may be smooth, so as to be capable of being forced in and out without too great difficulty. I prefer, especially when employing the construction of locking-washer shown in Fig. 1, to screw-thread the periphery of the ring D so as to permit it to serve a function which will presently be described, and when thus employed I prefer to provide the outer face of the ring D with recesses $m$, extending part way through the ring, the function of which will be presently described.

As indicated in the drawings, the hub at each extremity is internally screw-threaded, and the operation of locking the rings in place is accomplished through the medium of nuts as follows: As indicated in Fig. 7 the locking-nuts are in the form of two disks screw-threaded at their peripheries and of equal diameter, the inner diameter being slightly in excess of the outer diameter of the shaft A. The inner of these disks is provided with an annular recess on the inner central edge to receive a washer E, fitting closely around the shaft A and loosely in the recess. The function of this washer is to prevent the access of dust to the balls. Of these two disks the outer one F is provided with holes $l$ to receive the points of a wrench and the inner washer F' is provided with recesses $m$ of the same diameter as the holes $l$, but extending only part way through the disk F'. Between the disks F and F' is a disk of paper $F^2$, perforated to coincide with the perforations $l$ and recesses $m$. When the construction is that shown in Fig. 1, a single disk F, provided with perforations $l$ and screw-threaded on its periphery and having at one inner corner the recess for the washer E, is employed, the outer face of the ring D being recessed, as shown in Figs. 1 and 4, and a disk $F^2$ of paper, perforated as before, is introduced between the washer F and ring D. The operation in either case is substantially the same—that is to say, a wrench having prongs long enough to pass through the perforations $l$ and extend into the recesses $m$ to the base thereof is first introduced and its manipulation causes the turning up of both disks F F' or of the disk F and ring D, as the case may be, and when the nut thus constituted has been turned home a second wrench is employed, the prongs of which will enter the holes $l$, but will not extend into the holes formed in the paper disk $F^2$, and therefore not into the recesses $m$. The susceptibility of the paper disk to pressure permits the outer disk F to be turned inward, jamming its screw-threads in the internal screw-threads formed on the hub and producing a lock of the nut sufficiently firm and unyielding in its character to hold the parts against displacement under any movement of the hub or axle. Inasmuch as the internal diameter of the nuts and rings is such as to retain them out of contact with the hub or any part moving with the hub it is quite apparent that all friction which may be presented between the hub and axle is taken up by the balls and is thus reduced to the minimum. Where the axle A revolves, as in the case of the pedal-shaft shown in Fig. 7, the revolution of the shaft causes an exudation of oil to take place by centrifugal action; but where it is stationary, as in the structure shown in Fig. 1, in which the wheel revolves upon the axle it is preferable to have the passages $s$ extend downward to cause the feed to take place by gravity.

The securing of the spoke to the hub in accordance with my invention involves the provision of radially-extending thimbles G, internally screw-threaded, as shown. The spokes H are provided at their inner extremities with heads $k$ and are surmounted by external screw-threaded bushings I, centrally bored, as indicated, and provided on their outer ends with slots $h$, adapted to receive the prongs $h'$ of a wrench L. The bushing I having been placed upon the spoke H, the head $k$ is introduced into the thimble and the bushing is then by the manipulation of the wrench L screwed into place in the thimble. The internal bore of the bushing being less in diameter than the shoulder formed by the head $h$, it is quite apparent that by turning up the bushing the spoke may be tightened and will remain in its tightened position with reasonable security. Should any spoke become loosened in use, it may readily be tightened by applying the wrench L.

While I have described the lubricating device in connection with a bicycle, it will be quite apparent that its use is not confined to such an association. It may be employed with all kinds of bearings, whether ball-bearings or otherwise. Where more than two bearings are mounted upon the same shaft, several piston-heads $p$, to act as valve devices, may be employed, and, obviously, if only one be emloyed upon the shaft but one piston-head $p$ is necessary.

Among the desirable characteristics of my structure relating to the mode of holding the balls in position the more prominent are the readiness with which the shaft may be withdrawn, while a substantially perfect lock is provided to hold the parts from separation when applied together.

What I claim as new, and desire to secure by Letters Patent, is—

1. The lubricating mechanism for bicycle-bearings and similar purposes, comprising a hollow shaft perforated to produce the oil-expelling passage leading to the bearing, and a valve-stem having a piston-valve adapted to open and close said passage, said valve-stem being secured in place in the hollow shaft, substantially as described.

2. A lubricating device for bicycle and other bearings, comprising, in combination, a hollow shaft provided with two or more passages extending from the inside of the shaft to the bearings, a piston-valve stem carrying piston-heads and introduced into said shaft so as to adapt the piston-head to open and close the passages at will, and a recessed screw-threaded plug at the end of said stem, engaging internal screw-threads on the shaft, whereby turning of the stem manipulates the piston-valves to open and close the passages, substantially as described.

3. In a bicycle or similar vehicle, the ball-bearing-retaining device comprising, in combination, a hub having an internal shoulder, a shaft within the hub provided with an external shoulder having a concave outer face, and a ring introduced into the hub around the shaft and presenting on its inner face an annular surface affording a bearing for the balls opposite to that afforded by the shoulder on the shaft, substantially as described.

4. In a bicycle or similar vehicle, the ball-bearing-retaining device comprising a hub having an internal shoulder, rings introduced into said hub, each having a concave annular recess, and means, substantially as described, for holding said rings in place, as and for the purpose set forth.

5. In a bicycle or similar device, the ball-bearing-retaining mechanism comprising a shaft having a shoulder concaved on its outer side, a hub having an internal annular shoulder presenting an internal diameter to permit it to pass over the shoulder on the shaft, separable rings fitting closely in said hub and out of contact with the axle and shoulder thereon, each ring presenting in its face a concavity approximating the arc of a circle, and a locking device adapted to enter said hub and retain the rings against displacement, substantially as described.

6. In combination with a hub provided with an internal shoulder $o$ and an axle within the hub, the ball-bearing-retaining rings C and D, having on their contiguous faces annular concavities approximating the arc of a circle, a locking-nut having peripheral screw-threads to engage internal screw-threads on the hub and provided with apertures for the reception of wrench-prongs, the parts being arranged to operate substantially as described.

7. In a ball-bearing device, the combination, with the ball-retaining rings presenting concavities to embrace the balls, a locking device comprising two rings, one of which is provided with perforations $l$ and the other of which is provided with recesses $m$, extending part way through the body, and a yielding material, such as paper, introduced between the rings and provided with perforations to coincide with the apertures $l$, and recesses $m$, said parts being peripherally screw-threaded to engage internal screw-threads on the hub, the whole being arranged to operate substantially as described.

8. In a ball-bearing device, the combination, with the hub, of a ball retaining and locking device comprising, in combination, rings C D, introduced into the hub and embracing the ball, the outer of said rings having recesses to receive the point of wrench-prongs and peripherally screw-threaded to engage screw-threads on the interior of the hub, a ring F, constituting a nut and provided with perforations $l$ to receive the prongs of a wrench and peripherally screw-threaded to engage the screw-threads on the interior of the hub, and a disk of yielding material, such as paper, provided with perforations, as shown, to coincide with the perforations $l$, the parts being arranged to operate substantially as described.

9. In a bicycle or similar vehicle provided with annular ball-bearings, the means for preventing the access of dust to the bearings, comprising, in combination with the outer ring holding the ball-bearing in place, provided with an annular notch or groove at a point adjacent to the shaft, a shaft provided with an annular flange E, entering and moving freely in said notch or groove, substantially as described.

M. J. O'DONNELL.

In presence of—
M. J. FROST,
A. P. COBB.